United States Patent [19]

Zvonar et al.

[11] Patent Number: 5,663,899

[45] Date of Patent: Sep. 2, 1997

[54] REDUNDANT THERMOCOUPLE

[75] Inventors: John G. Zvonar; James Taylor, both of Austin, Tex.

[73] Assignee: Advanced Micro Devices, Sunnyvale, Calif.

[21] Appl. No.: 462,958

[22] Filed: Jun. 5, 1995

[51] Int. Cl.$^6$ .................................................. G01K 7/14
[52] U.S. Cl. ...................... 364/557; 236/15 BB; 374/179
[58] Field of Search ................................. 364/557, 575; 62/126; 236/15 BB; 374/179, 181, 182, 10, 112, 113; 205/782

[56] References Cited

U.S. PATENT DOCUMENTS

| | | | |
|---|---|---|---|
| 4,588,308 | 5/1986 | Saito | 374/181 |
| 5,325,678 | 7/1994 | Borah et al. | 62/126 |
| 5,496,450 | 3/1996 | Blumenthal et al. | 205/782 |

*Primary Examiner*—Emanuel T. Voeltz
*Assistant Examiner*—M. Kemper
*Attorney, Agent, or Firm*—Foley & Lardner

[57] ABSTRACT

A temperature sensing system contains a plurality of thermocouple pairs which are connected to an interface. The interface contains a microprocessor and a memory and provides for fault tolerance within the system by comparing measurements from each thermocouple within a thermocouple pair to a predetermined threshold value. If the difference between the thermocouple readings is greater than the threshold value, a malfunction is identified and corrective action is taken. The system determines which thermocouple has malfunctioned by comparing the readings of each of the thermocouples to a projected value based on historical data contained in the memory. The thermocouple whose reading varies to the greatest degree from its associated projected value is identified as the malfunctioning thermocouple. The reading from the properly functioning thermocouple is then used to produce an output signal. A likely cause of the malfunction can also be identified by specifying a short when the malfunctioning thermocouple provides a temperature reading substantially below its projected value, and specifying an open when the malfunctioning thermocouple provides a temperature reading substantially greater than its projected value.

17 Claims, 4 Drawing Sheets

REDUNDANT THERMOCOUPLE

BACKGROUND OF THE INVENTION

1. Field of the Invention

This invention is for use in the field of temperature sensing where precision temperature control is required. One such field is the development of semiconductor devices which includes the use of processing furnaces.

2. Description of Related Art

Thermocouples used to control processing furnace temperatures are prone to drift or to fail over a period of time. Drift can cause significant temperature fluctuations within a furnace, while a failure can result in complete furnace shutdowns. As a result of each of these problems, product yield and production throughput suffer.

SUMMARY OF THE INVENTION

It is therefore an object of the invention to solve the problems inherent in conventional thermocouple systems by providing an apparatus and method for using redundant pairs of thermocouples. Threshold values are provided which correspond to each pair of thermocouples. Each threshold value indicates a maximum allowable difference between the readings of the thermocouples within its corresponding pair.

It is a further object of the invention to provide, as a temperature reading, an average of the readings from the thermocouples within a pair of thermocouples when the difference between the thermocouple readings is less than the corresponding threshold value.

It is a still further object of the invention to provide an alarm identifying a malfunctioning thermocouple when the difference between the readings from the thermocouples within a pair exceeds the corresponding threshold value.

It is another object of the invention to maintain a historical data base of temperature readings from the thermocouples and consult the data base in order to determine which of the thermocouples within a pair is providing a reading most closely corresponding to a projected value based on its historical data. Based on this determination, the thermocouple which is varying from its projected value to the greatest degree can be identified as a malfunctioning thermocouple.

The invention thus provides an interface between an output device and one or more thermocouple pairs. This interface includes a microprocessor which receives input signals from the thermocouple pairs and provides an output signal to the output device. The interface also includes a memory connected to the microprocessor which stores a threshold value for each thermocouple pair and stores previous input signals from the thermocouple pairs as historical data. The microprocessor within the interface consults at least one of the threshold values and the historical data in the memory as part of its analysis of the input signals to produce the output signal.

The output device which communicates with the aforementioned interface can be, for example, a furnace controller and/or a display. For each thermocouple pair, the microprocessor receives an input signal from each of first and second thermocouples. The microprocessor compares a difference between the first thermocouple input signal and the second thermocouple input signal to the corresponding threshold value and outputs an average of the first and second thermocouple input signals to, for example, the furnace controller if the difference between the first and second thermocouple input signals is less than the corresponding threshold value. Similarly, the average value could be output to the display.

If the microprocessor determines that the difference between the first thermocouple input signal and the second thermocouple input signal is greater than the threshold value, the microprocessor then concludes that one of the first and second thermocouples within the pair of thermocouples is malfunctioning. Based on this information, the microprocessor consults the historical data associated with each of the first and second thermocouples within the pair of thermocouples to identify which thermocouple is providing a reading closer to its corresponding historical data. The microprocessor selects the thermocouple which is closest to its historical data as an accurate thermocouple and identifies the other thermocouple as the malfunctioning thermocouple. The microprocessor will thus provide the reading from the accurate thermocouple to the output device or devices. The microprocessor may also flag the malfunctioning thermocouple for subsequent identification via a warning or alarm signal.

In accordance with the invention, each thermocouple pair is distributed within a corresponding zone of a temperature sensing area. It is, of course, possible for the entire temperature sensing area to constitute one zone, such that only a single pair of thermocouples is used. However, most practical applications will require temperature sensing within an area that is too large to be accommodated by one pair of thermocouples and will thus require segmentation of the temperature sensing area into a plurality of zones, each of which is serviced by a pair of thermocouples.

BRIEF DESCRIPTION OF THE DRAWINGS

These and other objects of the invention will be apparent to one of ordinary skill upon review of this disclosure and its corresponding figures, wherein.

DETAILED DESCRIPTION

Figure 1:
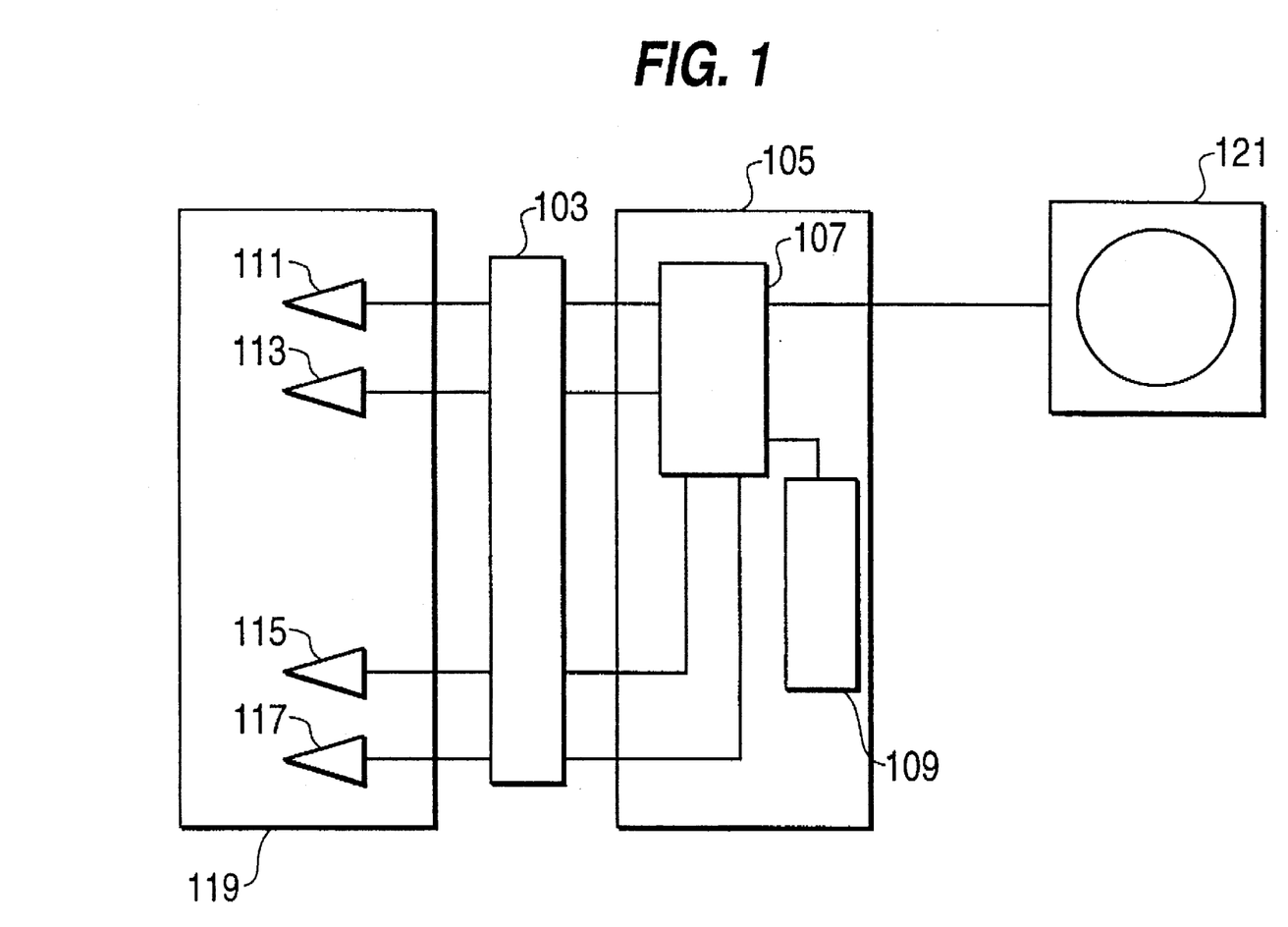
FIG. 1 shows a first embodiment according to the invention.

FIG. 1 shows a first embodiment of the invention in which interface 105 contains microprocessor 107 and memory 109. Microprocessor 107 is connected to a thermocouple pair comprising thermocouples 111 and 113. Microprocessor 107 is also connected to another thermocouple pair comprising thermocouples 115 and 117. The thermocouples are positioned within temperature sensing area 119. Temperature sensing area 119 could be, for example, a furnace, such as a furnace used for processing semiconductors. Two pairs of thermocouples are shown by way of illustration and not limitation, as any number of pairs of thermocouples could be employed.

Where necessary, buffer circuits 103 may also be employed. Such buffer circuits may include circuitry to sample and hold the thermocouple signals and one or more analog to digital converters connected to the sample and hold circuits to provide digital signals to the microprocessor. The sequence of the sampling and the activation of the analog to digital converter can be directed by the microprocessor 107 in accordance with a program or can be directed by a user through a user interface. A separate analog to digital converter can be provided for each thermocouple. Alternatively, an analog to digital converter can be shared by the thermocouples within a pair of thermocouples, or within a plurality of thermocouples, in a time multiplexed manner.

Microprocessor 107 is connected to memory 109 of interface 105. Microprocessor 107 is also connected to display 121, which is an example of an output device.

In operation, thermocouples 111–117 provide input signals to microprocessor 107. Each input signal contains information representing a temperature reading taken by the thermocouple. Thus, from each of the thermocouples 111–117, microprocessor 107 receives a stream of input signals providing microprocessor 107 with temperature information. The stream of input signals can be virtually continuous, or can comprise periodic temperature readings taken in accordance with a temperature sensing interval. An example of such an interval could be that the thermocouples take a reading every ten seconds. This interval could be user defined by way of an input device connected to microprocessor 107. Microprocessor 107 can then control the thermocouples to obtain readings therefrom in accordance with the temperature sensing interval.

Microprocessor 107 provides an output signal to display 121. The output signal contains processed information regarding the input signals from the thermocouples. Thus, microprocessor 107 receives the input signals and produces the output signal based on processing the input signals. During processing, microprocessor 107 provides information to, and reads information from, memory 109. In particular, microprocessor 107 reads the threshold corresponding to the thermocouple pair from memory 109 and, for historical purposes, stores one or more of the individual thermocouple measurements to memory 109. The output signal resulting from the processing is supplied to display 121, where the information contained in the output signal is displayed to a user.

Figure 2:
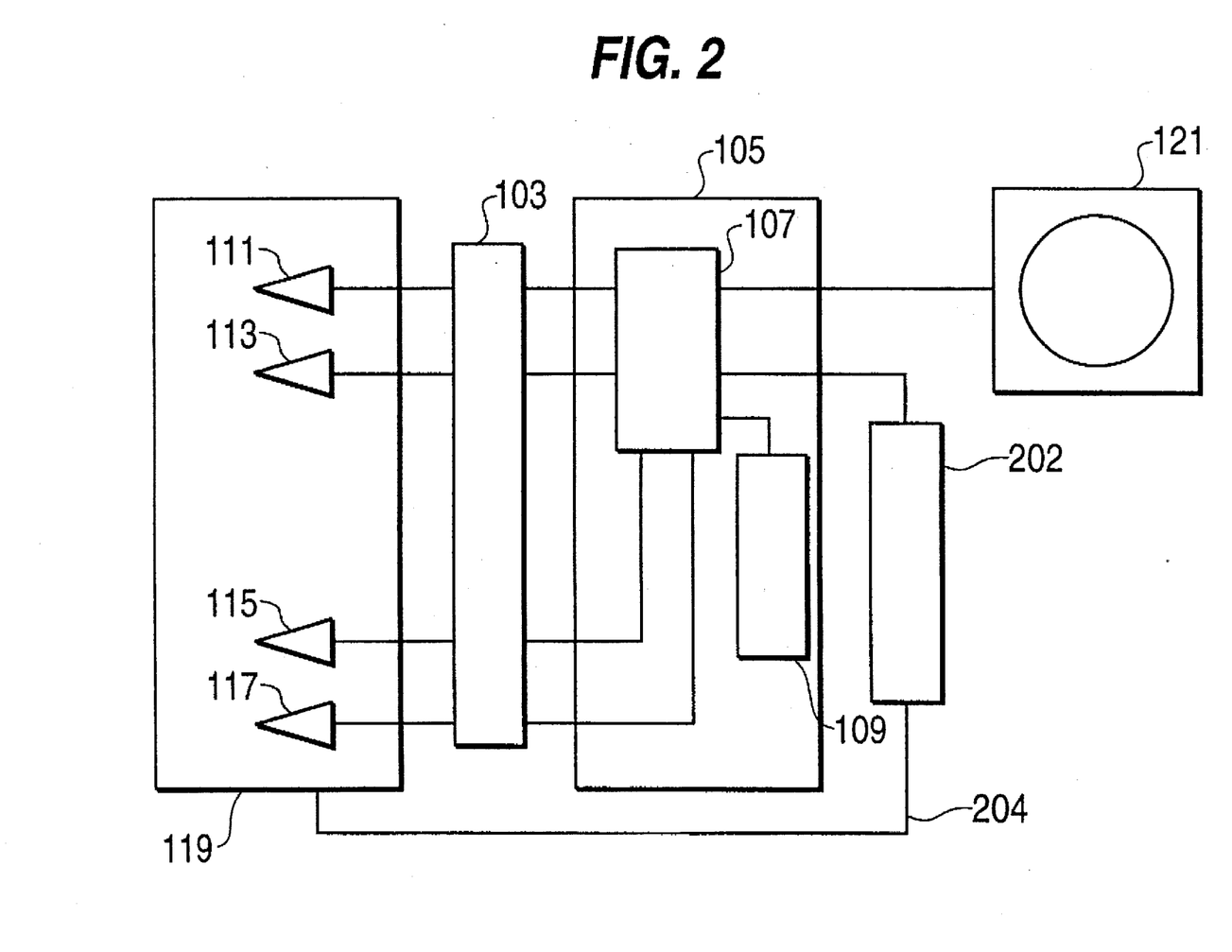
FIG. 2 shows a second embodiment according to the invention.

FIG. 2 shows an alternative embodiment wherein microprocessor 107 also provides an output to furnace controller 202. Thus, in this embodiment, microprocessor 107 receives the input signals and processes the input signals, while referring to memory 109, to produce an output signal for feedback control of a furnace which heats temperature sensing area 119. For example, the furnace can contain a heating element or other heating means which adjusts its setting automatically based on the output signal from microprocessor 107. Such a feedback, shown as line 204, can then cause the furnace to produce less heat when the output of microprocessor 107 shows the temperature sensing area is too hot, and to produce more heat when the output of microprocessor 107 shows the temperature is too cool. The determination of "too hot" and "too cool" can be made by comparing the output of microprocessor 107 to predetermined target temperatures, such as at the upper and lower ends of an acceptable temperature range.

Figure 3:
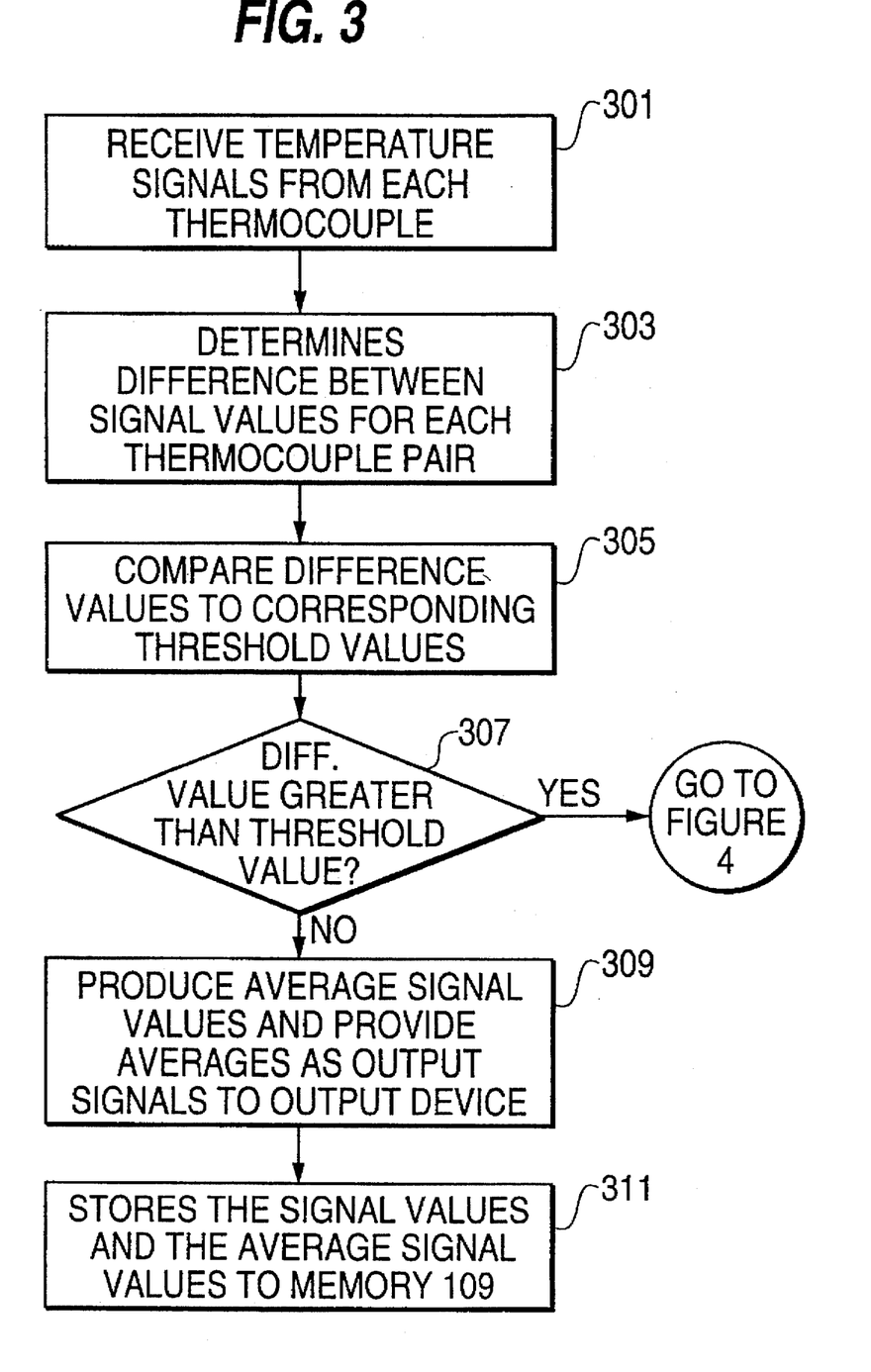
FIGS. 3 and 4 are a flowchart showing the operations of microprocessor 107 in both of the embodiments of FIGS. 1 and 2.
Figure 4:
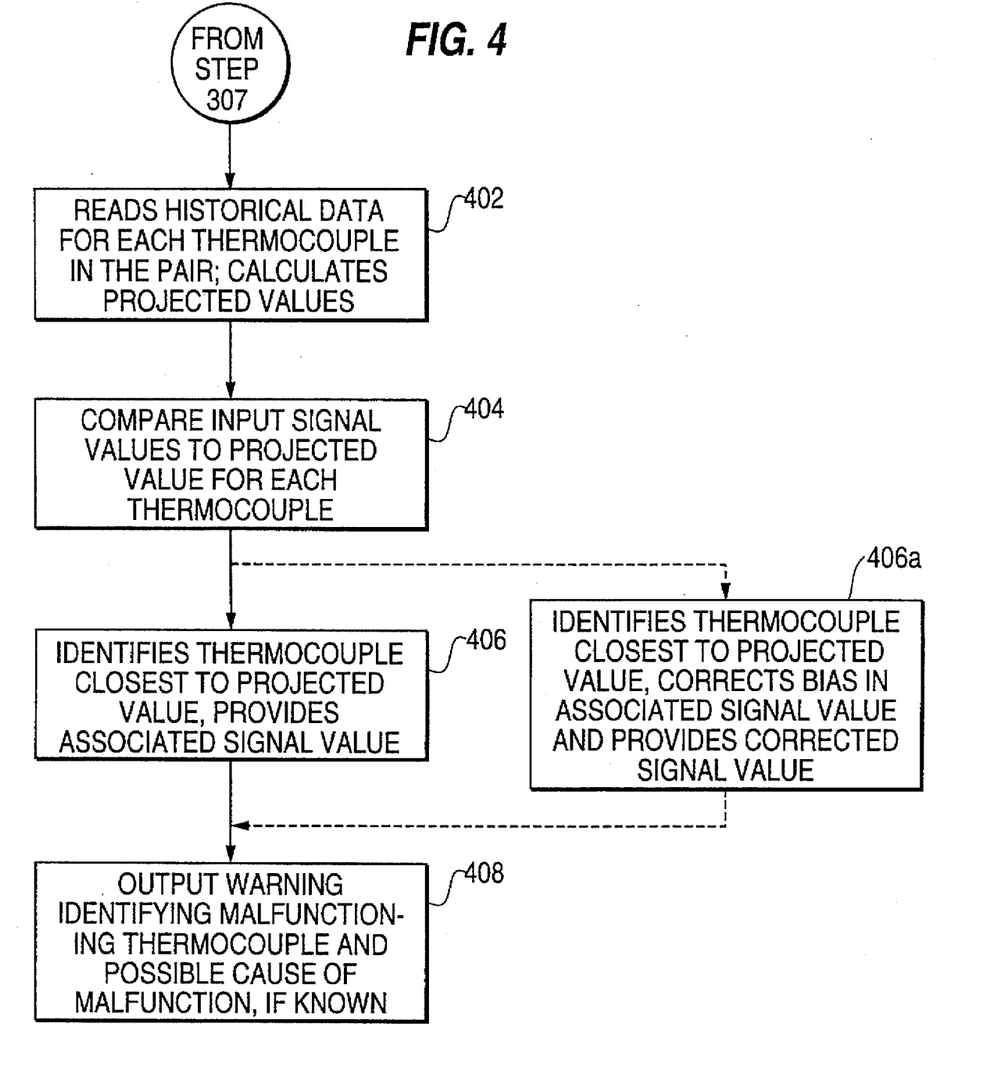

FIGS. 3 and 4 show flowcharts of the operations of microprocessor 107 and memory 109 under different conditions in both of the embodiments of FIGS. 1 and 2. At step 301, microprocessor 107 receives, as an input signal, a temperature signal from each thermocouple 111–117.

At step 303, microprocessor 107 determines, for each thermocouple pair, a difference between the signal values from the thermocouples of the thermocouple pair. For example, microprocessor 107 determines the difference between the signals received from thermocouple 111 and thermocouple 113. The resulting value is therefore associated with the 111/113 thermocouple pair. Similarly, for the pair of thermocouples 115 and 117, microprocessor 107 determines a difference between the values of the signals they supply to microprocessor 107.

For each thermocouple pair, as shown in step 305, microprocessor 107 compares the difference determined in step 103 with a threshold value. The threshold value can be a predetermined threshold value which is applied system-wide to each thermocouple pair, or can be uniquely associated with each individual thermocouple pair. Preferably, a user can set the threshold value for each thermocouple pair.

To provide user settability of thresholds, a user interface such as a keyboard or a manual switch linked to the microprocessor (not shown) would be provided. Using conventional techniques, a system-wide threshold or thresholds for each individual thermocouple pair could be stored in memory for later use by the microprocessor in comparing the temperatures measured by the thermocouples in each pair with the corresponding threshold.

For example, a user may set the threshold value for thermocouple pair 111/113 to be ten degrees Celsius. When microprocessor 107 determines in step 303 that the temperature signals from thermocouples 111 and 113 differ by ten degrees Celsius or less, for example, by five degrees Celsius, microprocessor 107 determines in step 305 that the difference between the signal values is smaller than the corresponding threshold value. If microprocessor 107 determines in step 303 that the signals from thermocouples 111 and 113 differ by more than ten degrees Celsius, for example, by 15 degrees Celsius, microprocessor 107 then determines in step 305 that the difference is greater than the corresponding threshold value of ten degrees Celsius.

As noted above, preferably the threshold values for each of the thermocouple pairs can be set by a user and stored in memory 109. Thus, a user input device (not shown) connected to memory 109, either directly or via microprocessor 107, enables a user to designate the threshold value for each thermocouple pair. Alternatively, individual threshold values for each thermocouple pair can be set during a system installation stage and stored in either microprocessor 107 or memory 109. Another option is for threshold values to be set during a manufacturing stage such that they are contained in firmware within microprocessor 107. As discussed above, the simplest alternative is for a system-wide threshold value which is applied to each of the thermocouple pairs, such that the microprocessor need not look up a unique threshold value during step 305 for each of the thermocouple pairs.

In step 307, microprocessor 107 then reacts based on the comparison of step 305. If the difference value is equal to or less than the threshold value for a given thermocouple pair, microprocessor 107 proceeds to step 309 where microprocessor 107 averages the signal values and provides the average as an output signal to an output device. An example of such an output device is display 121 shown in FIG. 1. Another example of an output device is furnace controller 202 shown in FIG. 2.

Microprocessor 107 can then proceed to step 311 where it stores the signal values and the average signal values in memory 109 to update the historical data stored therein.

Microprocessor 107 is then available to begin the temperature measuring process once again. The temperature measuring process can be initiated on a periodic basis, for example, by periodically sampling the thermocouple signals in accordance with an internal program, or can be initiated based on an external instruction received from, for example, a user via a user input device or a system level microprocessor contained within a system level control device.

If, in step 307, microprocessor 107 determines that the difference value is greater than the threshold value, microprocessor 107 then operates in accordance with the steps shown in FIG. 4. In many practical applications, microprocessor 107 simultaneously processes signals from a plurality of thermocouple pairs. Thus, the decision at step 307 can vary between the thermocouple pairs. In this case, if there is a malfunction in one of the plurality of thermocouple pairs, microprocessor 107 will proceed to step 311 for the properly functioning thermocouple pairs, while proceeding to the steps shown in FIG. 4 for the malfunctioning thermocouple pair based on an affirmative response for that pair in step 307. Also, if more than one thermocouple pair is malfunctioning at a given time, microprocessor 107 will proceed to the steps of FIG. 4 for each malfunctioning thermocouple pair. For purposes of simplicity, we will presume that the affirmative answer to the question of step 307 is related to only one thermocouple pair.

Microprocessor 107 will then proceed to step 402 where it reads historical data from memory 109 for each of the thermocouples in the thermocouple pair. In step 404, microprocessor 107 compares the values of the input signals for each of the thermocouples in the pair to the corresponding historical data.

The historical data used for this comparison can take the form of, for example, an historical average, which can be an average of previous input signals. Alternatively, a weighted average of the input signals can be used. Alternatively, the historical data can be used as trend data from which microprocessor 107 predicts the most likely reading for the thermocouples within a given thermocouple pair based on the most recent readings for that thermocouple pair.

For example, if the past ten readings from a thermocouple pair show that each thermocouple is providing readings showing an upward trend along a line with a given slope, microprocessor 107 can project, through extrapolation, that the next readings from the thermocouples will represent values at specific points on their corresponding lines. In this case, in steps 404 and 406, microprocessor 107 will compare the temperature readings to the projected values and determine which of the two thermocouples is providing a reading which varies to the greatest degree the value projected for that thermocouple by microprocessor 107. The thermocouple so determined will be identified as the faulty thermocouple.

The above example is based on a using the previous ten readings and an assumption that a straight line projection is proper. In practice, any number of historical readings can be used to make the projection and these readings can be analyzed by microprocessor 107 for any degree of trend analysis, such as second order or third order trend analysis and projection. The number of readings used and the degree of analysis can be dictated by a user, for example, via an input device, to comprise a user defined profile. Any user defined profile consistent with the application can be employed. Such a profile can be stored in memory 109 and be executed by microprocessor 107. Under program control, microprocessor 107 would also perform the averaging and timing functions. Alternatively, dedicated circuitry could be provided to perform these functions.

As should be clear, the bounds on the period of time for which the input signals are used to calculate the historical average can change in accordance with operational requirements. Also, these bounds can be set by the user via an input device or controlled by microprocessor 107. Further, these bounds can vary between thermocouple pairs.

In step 406, microprocessor 107 compares the input signal from each thermocouple to its corresponding historical data to identify which of the thermocouples in the pair has a signal value closest to its historical data or a projection therefrom. Microprocessor 107 then provides the signal value associated with the identified thermocouple as an output signal to indicate the temperature of the portion of the temperature sensing area 119 within which the thermocouple pair is located.

Instead of directly reporting the value of the closest thermocouple as the sensed temperature value, microprocessor 107 may adjust the value of the closest thermocouple to compensate for a measured bias associated with that thermocouple. For example, presume that in step 307 of FIG. 3, microprocessor 107 determines that the difference between the signal values from thermocouples 111 and 113 is greater than an associated threshold value. For example, presume the threshold value is ten degrees Celsius, yet the readings from thermocouples 111 and 113 are 900 degrees Celsius and 915 degrees Celsius, respectively. Microprocessor 107 thus determines, in accordance with FIG. 3, that the difference between the signal values for thermocouples 111 and 113 is greater than their associated threshold value. At this point, microprocessor 107 proceeds to step 402 where it reads historical data for each of thermocouples 111 and 113 from memory 109.

Presume that the area being sensed by thermocouples 111 and 113 has shown stable temperatures and the historical data read in step 402 show that thermocouple 111 historically provides a temperature signal of 900 degrees Celsius, while thermocouple 113 historically provides a temperature signal of 903 degrees Celsius. In this case, microprocessor 107 would have historically reported an average temperature of 901.5 degrees Celsius as the sensed temperature for the area covered by thermocouple pair 111 and 113 during the period of temperature stability. However, in the present case, where the difference between the two temperatures is greater than ten degrees Celsius, microprocessor 107 determines, in step 404, that thermocouple 113 varies from its historical data, and hence its projected reading, by ten degrees Celsius, while thermocouple 111 does not vary from its historical data at all. Microprocessor 107 thus determines that a malfunction is very likely associated with thermocouple 113. In such a case, microprocessor 107 can provide the temperature reading from thermocouple 111 as the sensed temperature for the region corresponding to the thermocouple pair in step 406. Alternatively, instead of directly providing the temperature reading from the thermocouple closest to a projected value based on its historical data in step 406, microprocessor 107 can recognize that thermocouple 111 normally provides a reading which is 1.5 degrees Celsius less than the average temperature reading reported for the 111/113 thermocouple pair. Microprocessor 107 can then add 1.5 degrees Celsius to the temperature reading from thermocouple 111 to correct this bias, producing a value of 901.5 degrees Celsius, and report this value as the sensed temperature for the area covered by thermocouples 111 and 113, as shown in step 406a.

Instead of a single bias value, a thermocouple may have differing biases associated with differing temperatures. In such a case, a profile can be associated with each thermocouple, the profile containing information showing the respective biases of the thermocouple for a plurality of temperatures. Such a profile can be created over time for a given thermocouple by microprocessor 107 determining, for each of a plurality of temperature ranges, an average difference between the readings of the given thermocouple and the sensed reading provided as the output of the thermocouple pair containing the given thermocouple. Such a profile can be stored in memory 109. A bias table containing these bias values can exist in a portion of memory 109. This table can be updated by microprocessor 107 to contain a particular bias for each of a plurality of temperature ranges for each thermocouple. In adjusting for bias, microprocessor 107 can reference the bias profile of the given thermocouple, interpolate an appropriate adjustment to accommodate for the bias, and accordingly adjust the reading from the properly functioning thermocouple to produce the output signal.

Microprocessor 107 then proceeds to step 408 where it outputs a warning identifying the malfunctioning thermocouple. In this example, the warning would identify thermocouple 113 as requiring maintenance. This alarm can be provided to display 121. Alternatively, the alarm can be provided audibly or can be transmitted to a remote location to alert the appropriate maintenance personnel.

In addition to identifying the malfunctioning thermocouple, microprocessor 107 may identify a likely cause for the malfunction. The most common malfunctions are opens and shorts. An open thermocouple will cause a very high reading which drifts upward, while a shorted thermocouple produces a lower reading since the temperature signal represents a temperature at the shorting junction instead of a temperature reading at a measurement tip of the thermocouple within the furnace. Thus, in addition to identifying the malfunctioning thermocouple, microprocessor 107 can identify that the likely problem is an open, based on an unusually high reading, or a short, based on an unusually low reading.

Thus, an interface for use within a temperature sensing system provides for redundant thermocouple capability in a manner which substantially increases the fault tolerance of the system.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims. For example, any number of types of memories could be used to implement the system according to the invention. Further, functions disclosed herein as performed by the microprocessor could be implemented in other computing devices or could be constructed using analog and digital circuits as would be known to those of ordinary skill. Further, buffer circuits between the various elements can also be employed.

What is claimed is:

1. An interface between an output device and at least one thermocouple pair, the interface comprising a microprocessor receiving input signals from the thermocouple pair and providing an output signal to the output device in response to the input signals, further comprising a memory storing a threshold value for the thermocouple pair, wherein the microprocessor receives a first input signal from a first thermocouple of the thermocouple pair, a second input signal from a second thermocouple of the thermocouple pair, and the threshold value from the memory, the microprocessor compares a difference between the first input signal and the second input signal to the threshold value, and the microprocessor transmits an average of the first input signal and the second input signal as the output signal to the output device if the difference between the first input signal and the second input signal is less than the threshold value.

2. An interface as recited in claim 1, wherein the memory further stores previous input signals from the thermocouples as historical data, the microprocessor references the historical data to project a value for each of the first and second thermocouples and identify which of the first input signal and the second input signal is closest in value to its corresponding projected value if the difference between the first input signal and the second input signal is greater than the threshold value, and the microprocessor transmits the value of the input signal from the identified thermocouple as the output signal to the output device if the difference between the first input signal and the second input signal is greater than the threshold value.

3. An interface as recited in claim 1, wherein the memory further stores previous input signals from the thermocouples as historical data, the historical data including thermocouple profiles for each of the thermocouples, the microprocessor references the historical data to project a value for each of the first and second thermocouples and identify which of the first input signal and the second input signal is closest in value to its corresponding projected value if the difference between the first input signal and the second input signal is greater than the threshold value, the microprocessor adjusts the value of the input signal from the identified thermocouple to compensate for a bias identified in the corresponding thermocouple profile, and the microprocessor transmits the adjusted value as the output signal to the output device if the difference between the first input signal and the second input signal is greater than the threshold value.

4. An interface between an output device and at least one thermocouple pair, comprising:

a microprocessor receiving input signals from the thermocouple pair and providing an output signal to the output device in response to the input signals; and a memory connected to the microprocessor, the memory storing a threshold value for each thermocouple pair, the memory further storing previous input signals from the thermocouple pairs as historical data, wherein the microprocessor references at least one of the threshold values and the historical data in the memory as part of the analysis of the input signals to produce the output signal, and wherein the microprocessor receives, for each thermocouple pair, an input signal from each of a first thermocouple and a second thermocouple, the microprocessor compares a difference between the first thermocouple input signal and the second thermocouple input signal to the corresponding threshold value, and the microprocessor outputs an average of the first thermocouple input signal and the second thermocouple input signal to at least one of a furnace controller and a display if the difference between the first thermocouple input signal and the second thermocouple input signal is less than the corresponding threshold value.

5. An interface between an output device and at least one thermocouple pair, comprising:

a microprocessor receiving input signals from the thermocouple pair and providing an output signal to the output device in response to the input signals; and a memory connected to the microprocessor, the memory storing a threshold value for each thermocouple pair, the memory further storing previous input signals from the thermocouple pairs as historical data, wherein the microprocessor references at least one of the threshold values and the historical data in the memory as part of the analysis of the input signals to produce the output signal, and wherein the microprocessor receives, for each thermocouple pair, an input signal from each of a first thermocouple and a second thermocouple, the microprocessor compares a difference between the first thermocouple input signal and the second thermocouple input signal to the corresponding threshold value, and the microprocessor consults the historical data to project a value for each of the first and second thermocouples and identify which of the first thermocouple input signal and the second thermocouple input signal is closest in value to its corresponding projected value if the difference between the first thermocouple input signal and the second thermocouple input signal is greater than the corresponding threshold value, the input signal from the identified thermocouple being output to at least one of a furnace controller and a display.

6. An interface between an output device and at least one thermocouple pair, comprising:

a microprocessor receiving input signals from the thermocouple pair and providing an output signal to the output device in response to the input signals; and a memory connected to the microprocessor, the memory storing a threshold value for each thermocouple pair, the memory further storing previous input signals from the thermocouple pairs as historical data, wherein the microprocessor references at least one of the threshold values and the historical data in the memory as part of the analysis of the input signals to produce the output signal, and wherein the microprocessor receives, for each thermocouple pair, an input signal from each of a first thermocouple and a second thermocouple, the microprocessor compares a difference between the first thermocouple input signal and the second thermocouple input signal to the corresponding threshold value, and the microprocessor consults the historical data to project a value for each of the first and second thermocouples and identify which of the first thermocouple input signal and the second thermocouple input signal is furthest in value from its corresponding projected value if the difference between the first thermocouple input signal and the second thermocouple input signal is greater than the corresponding threshold value, the output signal being an alarm identifying the thermocouple furthest in value from its corresponding projected value.

7. A temperature sensing system comprising:

at least one thermocouple pair including a first thermocouple and a second thermocouple located within a corresponding zone of a temperature sensing area;

a microprocessor receiving input signals from the thermocouple pair and producing an output signal in response to the input signals;

a memory connected to the microprocessor, the memory storing a threshold value for the thermocouple pair; and an output device connected to the microprocessor, the output device receiving the output signal from the microprocessor, wherein the microprocessor receives a first input signal from a first thermocouple of the thermocouple pair, a second input signal from a second thermocouple of the thermocouple pair, and the threshold value from the memory, the microprocessor compares a difference between the first input signal and the second input signal to the threshold value, and the microprocessor outputs, as the output signal, an average of the first input signal and the second input signal if the difference between the first input signal and the second input signal is less than the threshold value.

8. A temperature sensing system as recited in claim 7, wherein the memory further stores previous input signals from the thermocouples as historical data, the microprocessor consults the historical data to project a value for each of the first and second thermocouples and identify which of the first input signal and the second input signal is closest in value to its corresponding projected value if the difference between the first input signal and the second input signal is greater than the threshold value, and the microprocessor outputs, as the output signal, the input signal from the identified thermocouple.

9. A temperature sensing system comprising:

a plurality of thermocouple pairs, each including a first thermocouple and a second thermocouple, distributed within a temperature sensing area, each thermocouple pair being within a corresponding zone in the temperature sensing area;

a microprocessor receiving input signals from the thermocouple pairs and producing an output signal based on an analysis of the input signals;

a memory connected to the microprocessor, the memory storing a threshold value for each thermocouple pair, the memory further storing previous input signals from the thermocouple pairs as historical data; and an output device connected to the microprocessor, the output device receiving the output signal from the microprocessor, wherein the microprocessor consults at least one of the threshold values and the historical data in the memory as part of the analysis of the input signals to produce the output signal, wherein the microprocessor receives, for each thermocouple pair, an input signal from each of the first thermocouple and the second thermocouple, the microprocessor compares a difference between the first thermocouple input signal and the second thermocouple input signal to the corresponding threshold value, and the microprocessor outputs an average of the first thermocouple input signal and the second thermocouple input signal to at least one of a furnace controller and a display if the difference between the first thermocouple input signal and the second thermocouple input signal is less than the corresponding threshold value.

10. A temperature sensing system comprising:

a plurality of thermocouple pairs, each including a first thermocouple and a second thermocouple, distributed within a temperature sensing area, each thermocouple pair being within a corresponding zone in the temperature sensing area;

a microprocessor receiving input signals from the thermocouple pairs and producing an output signal based on an analysis of the input signals;

a memory connected to the microprocessor, the memory storing a threshold value for each thermocouple pair, the memory further storing previous input signals from the thermocouple pairs as historical data; and an output device connected to the microprocessor, the output device receiving the output signal from the microprocessor, wherein the microprocessor consults at least one of the threshold values and the historical data in the memory as part of the analysis of the input signals to produce the output signal, wherein the microprocessor receives, for each thermocouple pair, an input signal from each of the first thermocouple and the second thermocouple, the microprocessor compares a difference between the first thermocouple input signal and the second thermocouple input signal to the corresponding threshold value, and the microprocessor consults the historical data to project a value for each of the first and second thermocouples and identify which of the first thermocouple input signal and the second thermocouple input signal is closest in value to its corresponding projected value if the difference between the first thermocouple input signal and the second thermocouple input signal is greater than the corresponding threshold value, the input signal from the identified thermocouple being output to at least one of a furnace controller and a display.

11. A temperature sensing system comprising:

a plurality of thermocouple pairs, each including a first thermocouple and a second thermocouple, distributed within a temperature sensing area, each thermocouple pair being within a corresponding zone in the temperature sensing area;

a microprocessor receiving input signals from the thermocouple pairs and producing an output signal based on an analysis of the input signals;

a memory connected to the microprocessor, the memory storing a threshold value for each thermocouple pair, the memory further storing previous input signals from the thermocouple pairs as historical data; and an output device connected to the microprocessor, the output device receiving the output signal from the microprocessor, wherein the microprocessor consults at least one of the threshold values and the historical data in the memory as part of the analysis of the input signals to produce the output signal, wherein the microprocessor receives, for each thermocouple pair, an input signal from each of the first thermocouple and the second thermocouple, the microprocessor compares a difference between the first thermocouple input signal and the second thermocouple input signal to the corresponding threshold value, and the microprocessor consults the historical data to project a value for each of the first and second thermocouples and identify which of the first thermocouple input signal and the second thermocouple input signal is furthest in value from its corresponding projected value if the difference between the first thermocouple input signal and the second thermocouple input signal is greater than the corresponding threshold value, the output signal being an alarm identifying the thermocouple furthest in value from its corresponding projected value.

12. A method of sensing and reporting a temperature value in a redundant thermocouple system, the method comprising the steps of:

(a) inputting a first temperature input signal from a first thermocouple and a second temperature input signal from a second thermocouple into a microprocessor;

(b) determining in the microprocessor a difference between the first temperature input signal and the second temperature input signal;

(c) comparing the difference determined in step (b) with a predetermined threshold value stored in a memory; and (d) averaging in the microprocessor the first temperature input signal and the second temperature input signal and outputting the average as the temperature value if the result of step (c) is that the difference is less than or equal to the threshold value.

13. The method recited in claim 12, further comprising the step of:

(e) comparing the first temperature input signal to a first projected value corresponding to the first thermocouple and the second temperature input signal to a second projected value corresponding to the second thermocouple to determine which of the first and second temperature input signals is closest in value to its corresponding projected value and outputting a temperature signal representing the temperature input signal closest in value to its projected value if the result of step (c) is that the difference is greater than the threshold value.

14. A method as recited in claim 13, further comprising the step of issuing an alarm signal identifying the thermocouple whose temperature input signal is furthest from its corresponding projected value if the result of step (c) is that the difference is greater than the threshold value.

15. A method as recited in claim 13, further comprising the steps of updating historical data corresponding to the first thermocouple to include the first temperature input signal and updating historical data corresponding to the second thermocouple to include the second temperature input signal if the result of step (c) is that the difference is less than or equal to the threshold value.

16. A method as recited in claim 13, further comprising the step of updating historical data corresponding to the thermocouple whose temperature input signal is closest to its corresponding projected value if the result of step (c) is that the difference is greater than the threshold value.

17. The method recited in claim 12, further comprising the steps of:

(e) comparing the first temperature input signal to a first projected value corresponding to the first thermocouple and the second temperature input signal to a second projected value corresponding to the second thermocouple to determine which of the first and second temperature input signals is closest in value to its corresponding projected value if the result of step (c) is that the difference is greater than the threshold value;

(f) adjusting the temperature input signal identified in step (e) to compensate the identified temperature input signal for a corresponding bias; and (g) outputting a temperature signal representing the value of the adjusted temperature input signal if the result of step (c) is that the difference is greater than the threshold value.

* * * * *